(12) United States Patent
Rustomji et al.

(10) Patent No.: US 9,053,863 B2
(45) Date of Patent: Jun. 9, 2015

(54) ELECTROCHEMICAL ENERGY STORAGE DEVICE WITH COINCIDENT ELECTRICAL TERMINAL AND ELECTROLYTE FILL HOLE

(71) Applicant: Cooper Technologies Company, Houston, TX (US)

(72) Inventors: Cyrus Sam Rustomji, Walnut Creek, CA (US); Kyle Yun-Su Kim, Manteca, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 199 days.

(21) Appl. No.: 13/787,083

(22) Filed: Mar. 6, 2013

(65) Prior Publication Data

US 2014/0254066 A1    Sep. 11, 2014

(51) Int. Cl.
| | |
|---|---|
| *H01G 9/00* | (2006.01) |
| *H01G 2/10* | (2006.01) |
| *H01G 11/80* | (2013.01) |
| *H01G 9/145* | (2006.01) |
| *H01G 11/74* | (2013.01) |
| *H01G 11/82* | (2013.01) |
| H01M 2/04 | (2006.01) |
| H01M 2/30 | (2006.01) |
| H01M 2/36 | (2006.01) |

(52) U.S. Cl.
CPC ............... *H01G 2/103* (2013.01); *H01G 11/80* (2013.01); *H01G 9/145* (2013.01); *H01G 11/74* (2013.01); *H01G 11/82* (2013.01); *H01M 2/046* (2013.01); *H01M 2/30* (2013.01); *H01M 2/365* (2013.01); *Y02E 60/13* (2013.01)

(58) Field of Classification Search
USPC ......... 361/502, 503–504, 509–512, 513–525, 361/528–529
See application file for complete search history.

(56) References Cited

U.S. PATENT DOCUMENTS

| | | | |
|---|---|---|---|
| 6,449,139 | B1 | 9/2002 | Farahmandi et al. |
| 6,451,073 | B1 | 9/2002 | Farahmandi et al. |
| 6,631,074 | B2 | 10/2003 | Bendale et al. |
| 6,813,139 | B2 * | 11/2004 | Bendale et al. ............... 361/502 |
| 2006/0292442 | A1 * | 12/2006 | Shah et al. .................... 429/181 |
| 2008/0016664 | A1 | 1/2008 | Mitchell et al. |
| 2011/0236733 | A1 | 9/2011 | Lee et al. |
| 2011/0318615 | A1 | 12/2011 | Chun et al. |

FOREIGN PATENT DOCUMENTS

| | | |
|---|---|---|
| EP | 1909299 A1 | 4/2008 |
| WO | 2011080988 A1 | 7/2011 |

OTHER PUBLICATIONS

International Search Report and Written Opinion of International Application No. PCT/US2014/017902; Jul. 7, 2014; 12 pages.

* cited by examiner

*Primary Examiner* — Nguyen T Ha
(74) *Attorney, Agent, or Firm* — Armstrong Teasdale LLP

(57) ABSTRACT

An electrochemical energy storage device includes a housing, at least one energy storage element in the housing and operable with an electrolyte, a cap coupled to the housing, at least one electrolyte impregnation hole formed in the cap, and a first terminal lug attachable to the cap via the electrolyte impregnation hole.

30 Claims, 3 Drawing Sheets

ELECTROCHEMICAL ENERGY STORAGE DEVICE WITH COINCIDENT ELECTRICAL TERMINAL AND ELECTROLYTE FILL HOLE

BACKGROUND OF THE INVENTION

The field of the invention relates generally to electrochemical energy storage devices, and more specifically to electric double layer capacitor (EDLC) devices.

In electrical systems, secondary sources of current make it possible to accumulate, store and release electric power to an external electric circuit. Among these secondary sources are conventional batteries, conventional capacitors and electrochemical capacitors. Known devices of this kind include energy storage elements inside housings filled with electrolyte, and terminals for connecting the energy storage element to an electrical circuit. In the manufacture of such devices, filling the housing with electrolyte and sealing the housing thereafter can be problematic in some aspects, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

BRIEF DESCRIPTION OF THE DRAWINGS

Figure 1:
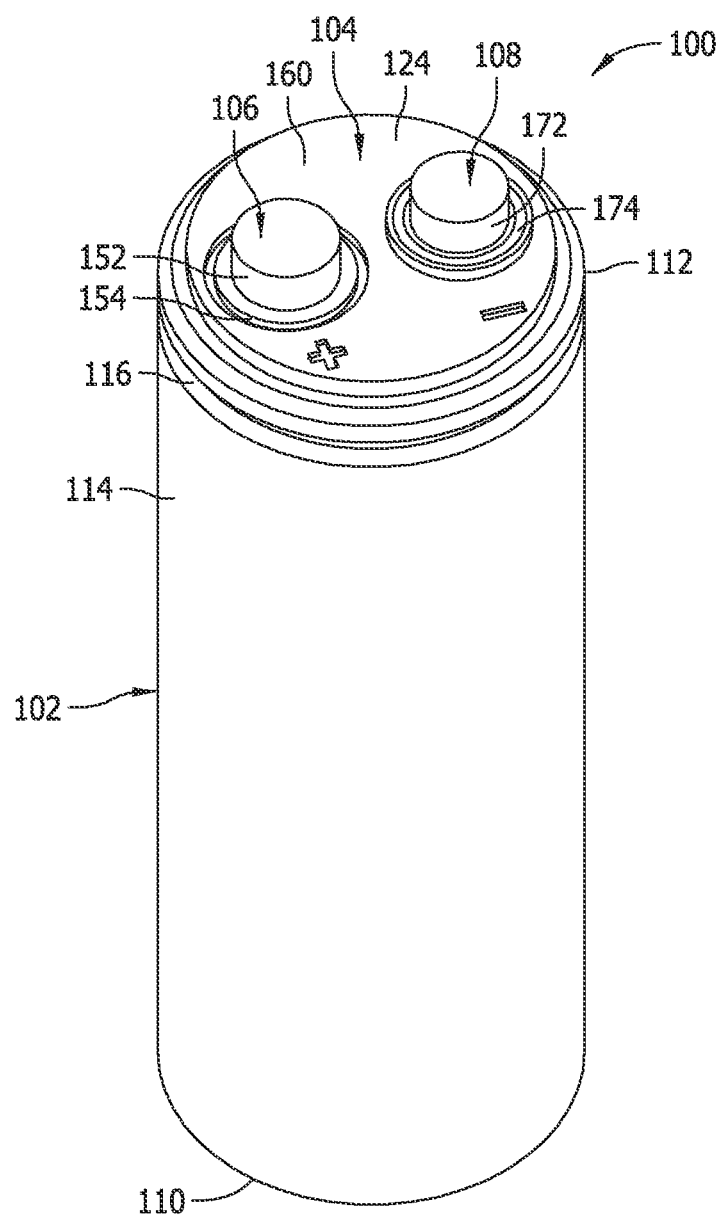
FIG. 1 is a perspective view of an exemplary embodiment of an electrochemical energy storage device.

Modern electrochemical energy storage devices, including but not limited to electric double layer capacitor (EDLC) devices, generally include a housing, sometimes referred to as a can, and at least one energy storage cell in the can. Terminals are also provided for connecting the energy storage cell of the device to external electrical circuitry. Such devices have many packaging styles which directly affect device performance of the devices in use.

Typically, low resistance devices such as EDLCs may use relatively large metal terminal lugs to make connections to relatively thick bus bars, for example, that interconnect a number of ELDC devices in series or parallel arrangements. These relatively large metal terminal lugs may be cast into a plastic housing in the construction of an EDLC device, but such cast lugs are prone to leakage, either from the edges where the can of the EDLC device is crimped to the plastic or between the plastic housing and metal terminal lug. For these reasons, a metal cap is preferred for EDLC devices having the desired large metal terminal lugs.

During manufacture of certain EDLC devices having metal caps and terminal lugs, electrolyte is introduced to impregnate the energy storage cell with an electrolyte solution by creating a hole in the metal cap, injecting electrolyte into the can through the created hole in the cap to impregnate the cell, and thereafter sealing the created hole with a small rubber plug and by an additional laser welding process. However, laser welding on the metal cap to seal the electrolyte impregnation hole is an additional step in the manufacture of the device which adds to scrap, labor, materials and cost of manufacturing the device. Creating and sealing such an electrolyte impregnation hole in the device construction can further lead to higher risks of electrolyte leakage if the metal cap is insufficiently welded. Similar problems may result if any electrolyte fill hole is created in the metal can of the device instead of a metal cap.

EDLC devices are also very sensitive to water contamination. Reducing trace water as devices are manufactured is accordingly major cost effort in EDLC device manufacturing, and such efforts involve cumbersome glove boxes or costly dry rooms in the fabrication of such devices. Most steps involved with EDLC device construction may be done in a dry environment easily. However, laser welding a metal cap or the metal can to close the electrolyte impregnation hole after electrolyte injection into the energy storage cell cannot be done in a dry room environment because of risk of a fire. Welding in a glove box can be difficult and therefore is not a desirable alternative. Improvements are desired.

Exemplary embodiments of electrochemical energy storage devices are described hereinbelow that overcome these and other disadvantages in the art. More specifically, exemplary embodiments of an EDLC device construction are described below having a cap and metal lug terminals that facilitate electrolyte introduction into the storage cell while eliminating any need for laser welding to seal a fill hole. The manufacture may therefore be completed entirely in a dry room environment in reduced time and with reduced cost. Method aspects will be in part explicitly discussed and in part apparent from the description below. Also, while described in the context of an EDLC device, the concepts described below may be applied to other types of energy storage devices, including but not limited to battery devices.

Figure 2:
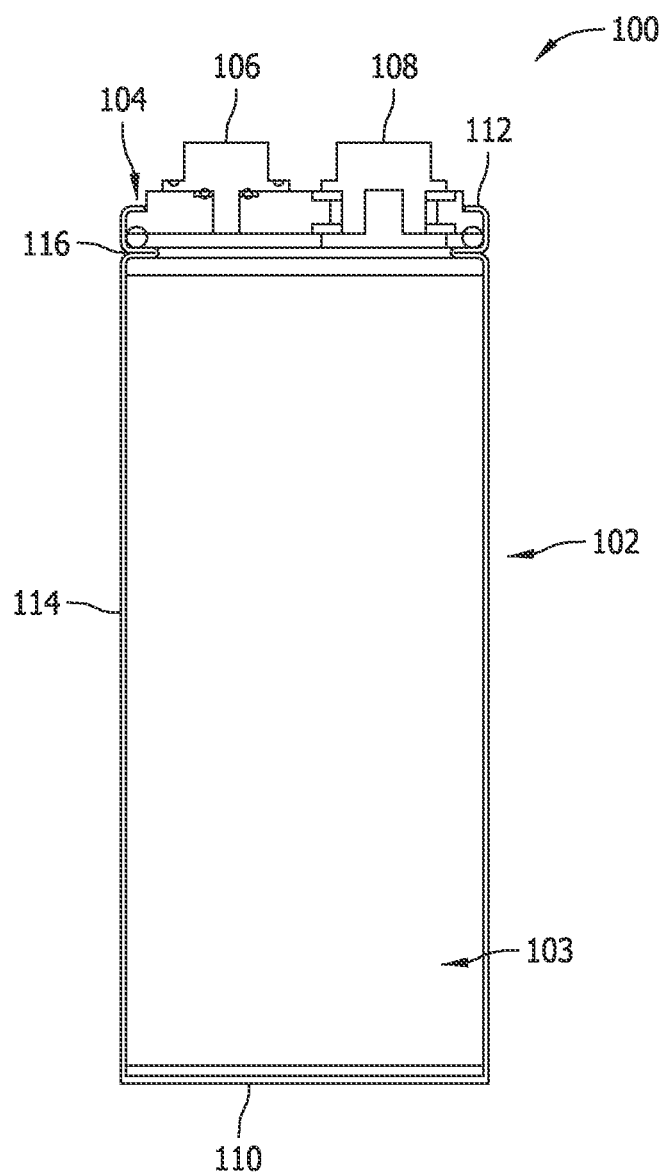
FIG. 2 is a sectional view of the device shown in FIG. 1.

FIG. 1 is a perspective view and FIG. 2 is a sectional view of an exemplary embodiment of an electrochemical energy storage device 100 including a housing 102, at least one energy storage element 103 (FIG. 2) in the housing. When the housing is filled with an electrolyte to impregnate the storage cell 103, the storage cell is operable to store and release electrical energy to and from an external electrical circuit. The device 100 also includes a cap 104 coupled to the housing 102 and the cap 104 includes first and second metal terminal lugs 106 and 108. As described below, at least one electrolyte impregnation hole is pre-formed in the cap 104 and the first terminal lug 106 is attachable to the cap via the electrolyte impregnation hole. The energy storage cell 103 may be filled with electrolyte and effectively sealed in a dry room environment without any need for laser welding.

The housing 102 in the example depicted in FIGS. 1 and 2 is a generally elongated cylindrical element having a first end 110, a second end 112 opposite the first end, and a cylindrical sidewall 114 extending between the first end 110 and the second end 112. The first end 110 is generally flat and planar, and the second end 112 is attached to the cap 104. The sidewall 114 between the first and second ends 110, 112 is generally round in cross section and has a constant diameter for most of its axial length measured between the first and second ends 110, 112. The housing 102 includes a restricted section 116 wherein the sidewall 114 is folded to facilitate connection of the cap 104 and sealing of the storage cell 103. The storage cell 103, as shown in FIGS. 1 and 2, extends in a receptacle in the housing 102 defined between the housing first end 110, the sidewall 114 and the restricted section 116. The housing 102 in exemplary embodiments may be formed from metal, such as steel or aluminum in exemplary embodiments, using known techniques. The housing 102 is often referred to as a can. In contemplated embodiments, the can 102 is fabricated from metal, including but not limited to steel or aluminum, in a known manner.

In one contemplated embodiment, the device 100 is an EDLC device, sometimes referred to as a supercapacitor that has, for example, specific capacitance of greater than 100 F/g, as opposed to conventional capacitors with specific capacitance on the order of only several F/g. Supercapacitors are used in a variety of different applications such as memory backup to bridge short power interruptions, battery management applications to improve the current handling of a battery, or to provide a current boost on high load demands.

The at least one storage cell 103 of the ELDC device 100 is situated internal to the receptacle defined by the housing 102 as shown. As the device 100 is manufactured, the storage cell 103 is filled with an electrolyte and the storage cell 103 includes a positive electrode (cathode), a negative electrode (anode), and a separator such as a membrane that separates the anode space from the cathode space.

The storage cell 103 may be provided as a generally tubular or cylindrical jelly roll having multiple layers that define a single cell or multiple cells. It is recognized that a jelly roll may alternatively be provided in other shapes and configurations, including but not limited to folded configurations and accordion shapes if desired. One or more current collectors (not shown) may also be provided to the jelly roll to interconnect the anode(s) and the electrodes(s) of the storage cell(s) 103. The metal terminal lugs 106, 108 provide respective electrical connection between the anode(s) of the storage cell(s) 103 and the cathode(s) of the energy storage cell(s) and external electrical circuitry.

The construction and operation of the storage cell in the housing 102 of the EDLC device 100 is well understood and will not be detailed further herein, expect to note that a jelly roll is not necessarily required in the storage cell 102. Rather, the anode and cathode electrodes and separators may be provided in a non-jelly roll form as desired and as known in the art.

Figure 3:
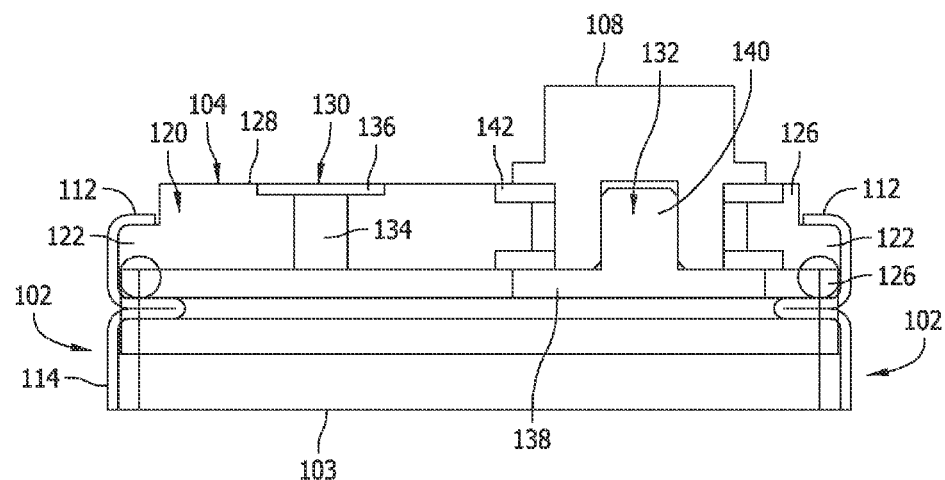
FIG. 3 illustrates a portion of the device shown in FIG. 1 at a first stage of manufacture.
Figure 4:
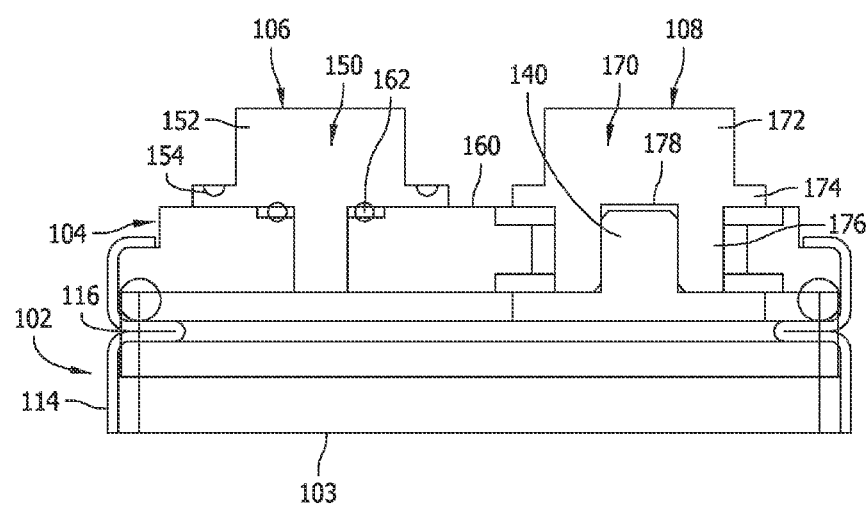
FIG. 4 illustrates a portion of the device shown in FIG. 1 at a second stage of manufacture.

The cap 104 in the embodiment illustrated includes a body 120 having a connector section 122 and a lug section 124. Each of the connector section 122 and 124 are round in the examples shown, and the connector section 122 has a larger diameter than the lug section 124. The connector section 122 as shown in FIGS. 3 and 4 is connected to the end 112 of the housing via, for example, a crimped connection. A sealing gasket 126 is also provided to seal the cap 104 and housing 102 connection proximate the housing restricted section 114.

In the exemplary embodiment shown, the body 120 further includes a first lug section 128 including a pre-formed electrolyte impregnation hole 130 and a second lug section 132 that respectively provide mechanical and electrical connection to the metal terminal lugs 106, 108.

The electrolyte impregnation hole 130, sometimes referred to a fill hole, is integrally formed with the cap 104 in the first lug section 128 and extends through the body 120 and into fluid communication with the interior receptacle of the housing 102 and the storage cell 103 therein. The fill hole 130 in the illustrated embodiment includes a first axial bore section 134 having a first diameter and a second receiving area 136 having a second diameter that is much larger than the first diameter of the axial bore section 134. The receiving area therefore provides a wide-mouthed area to receive electrolyte and the axial bore section 134 provides a passageway through the cap 104 to fill the storage cell 103 with electrolyte. By forming the fill hole 130 integrally with the body 120 of the cap 104, a pre-formed electrolyte fill hole is provided in the cap construction that obviates any need to create a fill hole at another stage in the manufacturing process.

The second lug section 132 of the cap 104 is formed with a flat base section 138 and a post section 140 extending perpendicularly from the flat base section 138. In the example shown, the body 120 including the first and second lug portions 128, 132 is fabricated from a metal material and a nonconductive bushing 142 is provided to electrically isolate the first lug portion 128 from the second lug section 132. In other embodiments, non-metal cap constructions may be utilized as long as the metal lugs 106, 108 can be electrically connected to the storage cell.

The metal lug 106 (as seen in FIGS. 2-4) includes a body 150 defining a circuit connector section 152, a base section 154 and a fill hole connector post section 156. The circuit connector section 156 is generally cylindrical and has a first diameter, the base section 154 is generally cylindrical and has a second diameter greater than the first diameter of the circuit connector section 152, and the fill hole connector post section 156 has a third diameter that is much smaller than the first diameter of the circuit connector section 152. The fill hole connector post section 156 extends through the axial bore section 134 of the fill hole 130 in the first lug section 128. In one contemplated embodiment, the fill hole connector post section 156 and the axial bore section 134 may be mechanically and electrically joined to one another via threaded engagement, although other adaptations or variations are possible to mechanically and electrically couple the post section 156 of the lug 106 to the fill hole section 134 in the cap 104. Regardless, the bore section 134 of the fill hole 130 is utilized both to facilitate electrolyte introduction to the device 100 as well as provide mechanical and electrical connection to the terminal lug 106. This arrangement is sometimes referred to as a coincident electrical terminal and electrolyte fill hole 130.

The base section 154 of the lug 106 rests on an upper surface 160 of the cap body 120 when the lug 106 is attached, and a sealing element such as an O-ring is provided around the fill hole connector post section 156 in the wide-mouthed receiving area 136 of the fill hole 130. The circuit connector section 152 projects upwardly from the upper surface 160 of the cap 104. The circuit connector section 152 extends as a truncated cylinder from the upper surface 160. That is, the circuit connector section 152 has a flat or planar top wall extending parallel to but spaced from the upper surface 160 and a cylindrical sidewall extending perpendicularly to the top wall of the circuit connector section.

The metal lug 108 (as seen in FIGS. 2-4) includes a body 170 defining a circuit connector section 172, a base section 174 and connector post section 176 formed with an internal bore 178 that receives the post section 140 of the second lug portion 132 of the cap 104. The circuit connector section 172 is generally cylindrical and has a first diameter, the base section 174 is generally cylindrical and a has a second diameter greater than the first diameter of the circuit connector section 172, and connector post section 176 has a third diameter about equal to the circuit connector section 172. The circuit connector section 176 projects upwardly from the upper surface 160 of the cap 104, and the base section 174 is seated in a generally parallel orientation to the base section 164 of the lug 106. Like the lug 108, the circuit connector section 172 extends as a truncated cylinder from the upper surface 170. That is, the circuit connector section 172 has a flat or planar top wall extending parallel to but spaced from the upper surface 160 and a cylindrical sidewall extending perpendicularly to the top wall of the circuit connector section.

In one embodiment, the inner bore 178 of the lug 108 and the post section 140 of the lug section 132 are mechanically and electrically engaged via a threaded connection, although other arrangements are possible. For example, the lug 108 may be press fit to the through-hole to provide metal-metal contact therebetween. In another embodiment, the lug 108 could be laser welded to the lug section 132 prior to assembly of the cap 104 to the housing 102.

The lugs 106 and 108 are therefore provided in different configurations for attachment to the fill hole 130 and the second lug section 132, respectively. The lug 106 is fabricated as a male lug attachable to the fill hole 130, while the lug 108 is fabricated as a female lug attachable to the post section 140 of the lug section 132. It is recognized, however, that this may be effectively reversed and the lug 106 may be fabricated as a female connector while the lug 108 is fabricated as a male connector. Also, it is recognized that in other embodiments the lugs 106, 108 may each be male lugs or may each be female lugs. In an embodiment having each of the lugs 106 being male lugs, each of the lugs may be attachable to the cap 104 via a respective electrolyte fill hole 130. That is, more than one electrolyte fill hole 130 may be provided in the cap 104 that is plugged and sealed with each terminal lug 106, 108.

While in the example shown in FIG. 1, the lug 106 defines a positive terminal for connection to an external electrical circuit and the lug 108 defines a negative terminal for connection to an external electrical circuit, this too may be reversed. That is, the lug 106 may define a negative terminal and the lug 108 may define a positive terminal in another embodiment. The lugs 106, 108 may further be fabricated to have different diameters to provide a polarized feature wherein the device 100 can be installed to an external circuit only in one orientation to ensure that the positive terminal and negative terminal of the device are connected to positive and negative terminals of the circuit, respectively.

In a contemplated method of assembly 100, the storage cell 103 is assembled and provided in the housing 102 in a known manner, and the cap 104 may be provided with the lug 108 pre-assembled. The cap 104 including the lug 108 may therefore be attached to the housing 102 via a crimp connection or other technique known in the art. The electrolyte may then be introduced via the fill hole 130 to impregnate the storage cell 103. The lug 106 and gasket 162 may then be provided to plug and seal the fill hole 130. The sealing of the fill hole 130 after electrolyte impregnation does not require a laser welding step and does not introduce additional holes to the cap assembly. The device 100 may accordingly be manufactured at lower cost, with reduced scrap, with a reduced chance of electrolyte leaks compared to known methods of manufacturing EDLC devices 100.

Because there is no laser welding step to be performed after the electrolyte is introduced, so sealing of the impregnation hole 130 may be done in a dry-room environment without a risk of fire due to laser welding. An inert-atmosphere in a glove box is also not required to complete the manufacture of the device. Further, in comparison to known methods of manufacturing similar devices, there are less holes created through a cap assembly to minimize risk of electrolyte leakage.

In the example shown in the Figures, the terminal lugs 106, 108 are both coupled to the cap 104 on the same end 112 of the housing 102, with the lugs 106, 108 in spaced relation from one another on the cap 104. In another embodiment, however, one of the lugs 106, 108 may be provided on the end 112 and the other of the terminal lugs may be provided on the end 110 of the device. That is, first and second cap assemblies may be provided on the opposing ends of the device 100, with the one of the lugs 106, 108 attached to each cap assembly on the opposite ends of the device 100 and the lugs 106, 108 extending in opposing directions to one another. In an embodiment having caps on both ends 110, 112 of the housing 102, one or both of the caps may be provided with pre-formed electrolyte fill holes 130 that may be plugged and sealed with respective terminal elements such as the lugs 106, 108.

Also, while the coincident electrical terminal and electrolyte fill hole arrangement described above is illustrated in relation to metal terminal lugs 106, 108, other types of terminal elements having different shapes and configurations may be used in a similar manner if desired.

The benefits and advantages of the inventive concepts are now believed to be evident in view of the exemplary embodiments disclosed.

An embodiment of an electrochemical energy storage device has been disclosed including: a housing; at least one energy storage element in the housing and operable with an electrolyte; a cap coupled to the housing; at least one electrolyte impregnation hole formed in the cap; and a first terminal lug attachable to the cap via the electrolyte impregnation hole.

Optionally, the energy storage element includes a jelly roll. The cap may be fabricated from metal. The housing may be a metal can. The metal can may include one of a steel can and an aluminum can. The first terminal lug may be attachable to the electrolyte impregnation hole via threaded engagement. A sealing element may extend between a first portion of the first terminal lug and a portion of the cap.

The electrolyte impregnation hole may be formed through the cap to include a through-hole bore section having a first diameter and a receiving area having a second diameter, the second diameter being larger than the first diameter. The first terminal lug may include a connector section receivable in the through-hole bore section and a circuit connector section projecting from the cap. A second terminal lug may be coupled to the cap in a spaced relation from the first terminal lug, and the second terminal lug may be shaped differently from the first terminal lug. The cap may be formed with a post spaced from the electrolyte impregnation hole, and the second terminal lug may be attachable to the post. The second terminal lug may be electrically isolated from the first terminal lug on the cap.

The housing may include a first end and a second end opposing the first end, with the cap attached to the first end. The first terminal lug may define a positive terminal for the energy storage element, or may define a negative terminal for the energy storage element. The device may be an electric double layer capacitor (EDLC) device.

Another embodiment of an electrochemical energy storage device has been disclosed including: a housing having a first end, a second end and a sidewall between the first and second end; at least one energy storage element in the housing and internal to the sidewall; a cap coupled to the housing at the first end; at least one electrolyte fill hole formed in the cap whereby electrolyte may be introduced into the at least one storage cell through the cap; and a first terminal lug configured to be coupled to the cap via the at least one electrolyte impregnation hole.

Optionally, the energy storage element may include a jelly roll. The housing may include a metal can. The first terminal lug may be attachable to the electrolyte impregnation hole via threaded engagement. A sealing element may extend between a first portion of the first terminal lug and a portion of the cap. The electrolyte impregnation hole may be formed through the cap to include a through-hole bore section having a first diameter and a receiving area having a second diameter, the second diameter being larger than the first diameter. The first terminal lug may include a connector section receivable in the through-hole bore section and a circuit connector section projecting from the cap. A second terminal lug may be coupled to the cap in a spaced relation from the first terminal lug, and may be electrically isolated from the first terminal lug on the cap.

The housing may include a first end and a second end opposing the first end, with the cap attached to the first end. The first terminal lug may define a positive terminal for the energy storage element. The device may be an electric double layer capacitor (EDLC) device.

Another embodiment of an electrochemical energy storage device has been disclosed including: a housing having a first end, a second end and a sidewall between the first and second end, the first end and the sidewall collectively defining a receptacle; at least one energy storage element in the receptacle; a cap coupled to the housing at the first end, the cap including at least one pre-formed electrolyte fill hole defining a passageway whereby electrolyte may be introduced into the at least one storage cell through the cap; and a first terminal element coupled to the cap, the first terminal element comprising a fill hole connector post section coincident with and received in the electrolyte fill hole.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical energy storage device comprising:
   a housing;
   at least one energy storage element in the housing and operable with an electrolyte;
   a cap coupled to the housing;
   at least one electrolyte impregnation hole formed in the cap; and
   a first terminal lug attachable to the cap via the electrolyte impregnation hole.

2. The electrochemical energy storage device of claim 1, wherein the energy storage element comprises a jelly roll.

3. The electrochemical energy storage device of claim 1, wherein the cap is fabricated from metal.

4. The electrochemical energy storage device of claim 1, wherein the housing comprises a metal can.

5. The electrochemical energy storage device of claim 4, wherein the metal can comprises one of a steel can and an aluminum can.

6. The electrochemical energy storage device of claim 1, wherein the first terminal lug is attachable to the electrolyte impregnation hole via threaded engagement.

7. The electrochemical energy storage device of claim 1, further comprising a sealing element extending between a first portion of the first terminal lug and a portion of the cap.

8. The electrochemical energy storage device of claim 1, wherein the electrolyte impregnation hole is formed through the cap to include a through-hole bore section having a first diameter and a receiving area having a second diameter, the second diameter being larger than the first diameter.

9. The electrochemical energy storage device of claim 8, wherein the first terminal lug comprises a connector section receivable in the through-hole bore section and a circuit connector section projecting from the cap.

10. The electrochemical energy storage device of claim 1, further comprising a second terminal lug coupled to the cap in a spaced relation from the first terminal lug.

11. The electrochemical energy storage device of claim 10, wherein the second terminal lug is shaped differently from the first terminal lug.

12. The electrochemical energy storage device of claim 11, wherein the cap is formed with a post spaced from the electrolyte impregnation hole, the second terminal lug attachable to the post.

13. The electrochemical energy storage device of claim 10, wherein the second terminal lug is electrically isolated from the first terminal lug on the cap.

14. The electrochemical energy storage device of claim 1, wherein the housing includes a first end and a second end opposing the first end, the cap attached to the first end.

15. The electrochemical energy storage device of claim 1, wherein the first terminal lug defines a positive terminal for the energy storage element.

16. The electrochemical energy storage device of claim 1, wherein the first terminal lug defines a negative terminal for the energy storage element.

17. The electrochemical energy storage device of claim 1, wherein the device is an electric double layer capacitor (EDLC) device.

18. An electrochemical energy storage device comprising:
   a housing having a first end, a second end and a sidewall between the first and second end;
   at least one energy storage element in the housing and internal to the sidewall;
   a cap coupled to the housing at the first end;
   at least one electrolyte fill hole formed in the cap whereby electrolyte may be introduced into the at least one storage cell through the cap; and
   a first terminal lug configured to be coupled to the cap via the at least one electrolyte impregnation hole.

19. The electrochemical energy storage device of claim 18, wherein the energy storage element comprises a jelly roll.

20. The electrochemical energy storage device of claim 18, wherein the housing comprises a metal can.

21. The electrochemical energy storage device of claim 18, wherein the first terminal lug is attachable to the electrolyte impregnation hole via threaded engagement.

22. The electrochemical energy storage device of claim 18, further comprising a sealing element extending between a first portion of the first terminal lug and a portion of the cap.

23. The electrochemical energy storage device of claim 18, wherein the electrolyte impregnation hole is formed through the cap to include a through-hole bore section having a first diameter and a receiving area having a second diameter, the second diameter being larger than the first diameter.

24. The electrochemical energy storage device of claim 23, wherein the first terminal lug comprises a connector section receivable in the through-hole bore section and a circuit connector section projecting from the cap.

25. The electrochemical energy storage device of claim 18, further comprising a second terminal lug coupled to the cap in a spaced relation from the first terminal lug.

26. The electrochemical energy storage device of claim 25, wherein the second terminal lug is electrically isolated from the first terminal lug on the cap.

27. The electrochemical energy storage device of claim 18, wherein the housing includes a first end and a second end opposing the first end, the cap attached to the first end.

28. The electrochemical energy storage device of claim 18, wherein the first terminal lug defines a positive terminal for the energy storage element.

29. The electrochemical energy storage device of claim 18, wherein the device is an electric double layer capacitor (EDLC) device.

30. An electrochemical energy storage device comprising:
- a housing having a first end, a second end and a sidewall between the first and second end, the first end and the sidewall collectively defining a receptacle;
- at least one energy storage element in the receptacle;
- a cap coupled to the housing at the first end, the cap including at least one pre-formed electrolyte fill hole defining a passageway whereby electrolyte may be introduced into the at least one storage cell through the cap; and
- a first terminal element coupled to the cap, the first terminal element comprising a fill hole connector post section coincident with and received in the electrolyte fill hole.

* * * * *